US012574588B2

(12) United States Patent
Ganster et al.

(10) Patent No.: US 12,574,588 B2
(45) Date of Patent: Mar. 10, 2026

(54) IMAGE SELECTION USING MOTION DATA

(71) Applicant: COMCAST CABLE COMMUNICATIONS, LLC, Philadelphia, PA (US)

(72) Inventors: Christopher Ganster, Philadelphia, PA (US); Craig Skinfill, Philadelphia, PA (US); James Miller, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 54 days.

(21) Appl. No.: 17/861,998

(22) Filed: Jul. 11, 2022

(65) Prior Publication Data

US 2022/0345772 A1     Oct. 27, 2022

Related U.S. Application Data

(63) Continuation of application No. 15/887,662, filed on Feb. 2, 2018, now Pat. No. 11,399,207.

(51) Int. Cl.
| | |
|---|---|
| *H04N 21/431* | (2011.01) |
| *G06F 3/04817* | (2022.01) |
| *G06F 3/0483* | (2013.01) |
| *G06F 3/04842* | (2022.01) |
| *G06F 16/783* | (2019.01) |
| *H04N 21/2343* | (2011.01) |
| *H04N 21/4223* | (2011.01) |
| *H04N 21/4402* | (2011.01) |
| *H04L 67/02* | (2022.01) |

(52) U.S. Cl.
CPC ..... *H04N 21/4312* (2013.01); *G06F 3/04817* (2013.01); *G06F 3/0483* (2013.01); *G06F 3/04842* (2013.01); *G06F 16/783* (2019.01); *H04N 21/2343* (2013.01); *H04N 21/4223* (2013.01); *H04N 21/4402* (2013.01); *H04L 67/02* (2013.01)

(58) Field of Classification Search
CPC .................................................... G06V 20/52
See application file for complete search history.

(56) References Cited

U.S. PATENT DOCUMENTS

| | | | |
|---|---|---|---|
| 5,969,755 A | 10/1999 | Courtney et al. | |
| 6,766,098 B1 | 7/2004 | McGee et al. | |
| 8,385,418 B2 * | 2/2013 | Crawford ............. | H04N 19/527 |
| | | | 375/240.16 |
| 9,215,355 B2 * | 12/2015 | Chen ....................... | H04N 23/81 |
| 9,232,249 B1 * | 1/2016 | Chakrovorthy .. | H04N 21/25808 |
| 10,104,394 B2 * | 10/2018 | Licata ............. | G08B 13/19604 |
| 2003/0085998 A1 | 5/2003 | Ramirez-Diaz et al. | |
| 2003/0228128 A1 | 12/2003 | Taylor et al. | |
| 2004/0042552 A1 * | 3/2004 | Dvorkovich ............ | G06T 7/238 |
| | | | 348/E5.066 |

(Continued)

FOREIGN PATENT DOCUMENTS

EP          0805405 A2     11/1997

*Primary Examiner* — Frank Johnson
(74) *Attorney, Agent, or Firm* — Ballard Spahr LLP

(57) ABSTRACT

Disclosed are systems and methods for selecting images using motion data. Video data and motion metadata can be received from a camera. A frame in the video data can be selected using the motion metadata. An image can be generated using the selected frame. A user interface comprising an element based on the image can be generated.

20 Claims, 5 Drawing Sheets

200

| Byte Index | Value | Data |
|---|---|---|
| 0 | 0x00 | Version = 0 |
| 1 | 0x3F | tag1; tag2; 100% pixels change |
| 2 | 0x1F | tag1; 100% pixels change |
| 3 | 0x09 | 81-90% pixels change |
| 4 | 0x08 | 71-80% pixels change |
| 5 | 0x07 | 61-70% pixels change |
| 6 | 0x05 | 41-50% pixels change |
| 7 | 0x05 | 41-50% pixels change |
| 8 | 0x02 | 11-20% pixels change |
| 9 | 0x00 | 0% pixels change |
| 10 | 0x00 | 0% pixels change |
| 11 | 0x00 | 0% pixels change |
| 12 | 0x00 | 0% pixels change |
| 13 | 0x00 | 0% pixels change |
| 14 | 0x00 | 0% pixels change |
| 15 | 0x00 | 0% pixels change |

(56) References Cited

U.S. PATENT DOCUMENTS

| | | | |
|---|---|---|---|
| 2005/0226331 A1 | 10/2005 | Mohamed et al. | |
| 2007/0182861 A1 | 8/2007 | Luo et al. | |
| 2008/0088706 A1* | 4/2008 | Girgensohn | H04N 7/181 |
| | | | 348/207.99 |
| 2008/0256450 A1 | 10/2008 | Takakura et al. | |
| 2011/0177841 A1 | 7/2011 | Attwood et al. | |
| 2011/0191011 A1 | 8/2011 | McBride et al. | |
| 2012/0246279 A1 | 9/2012 | Zang et al. | |
| 2014/0074759 A1* | 3/2014 | Lewis | G06F 16/743 |
| | | | 706/12 |
| 2015/0243326 A1 | 8/2015 | Pacurariu et al. | |
| 2015/0363635 A1* | 12/2015 | Suri | G06T 7/11 |
| | | | 386/241 |
| 2015/0364158 A1 | 12/2015 | Gupte et al. | |
| 2016/0042621 A1 | 2/2016 | Hogg et al. | |
| 2016/0055381 A1 | 2/2016 | Adsumilli et al. | |
| 2016/0099022 A1 | 4/2016 | Espeset et al. | |
| 2017/0039729 A1 | 2/2017 | Wang et al. | |
| 2018/0115788 A1* | 4/2018 | Burns | G06V 20/41 |
| 2018/0232592 A1 | 8/2018 | Stewart et al. | |
| 2018/0338132 A1* | 11/2018 | Rao Padebettu | H04N 13/344 |

* cited by examiner

| Byte Index | Value | Data |
|---|---|---|
| 0 | 0x00 | Version = 0 |
| 1 | 0x3F | tag1; tag2; 100% pixels change |
| 2 | 0x1F | tag1; 100% pixels change |
| 3 | 0x09 | 81-90% pixels change |
| 4 | 0x08 | 71-80% pixels change |
| 5 | 0x07 | 61-70% pixels change |
| 6 | 0x05 | 41-50% pixels change |
| 7 | 0x05 | 41-50% pixels change |
| 8 | 0x02 | 11-20% pixels change |
| 9 | 0x00 | 0% pixels change |
| 10 | 0x00 | 0% pixels change |
| 11 | 0x00 | 0% pixels change |
| 12 | 0x00 | 0% pixels change |
| 13 | 0x00 | 0% pixels change |
| 14 | 0x00 | 0% pixels change |
| 15 | 0x00 | 0% pixels change |

Figure 3:
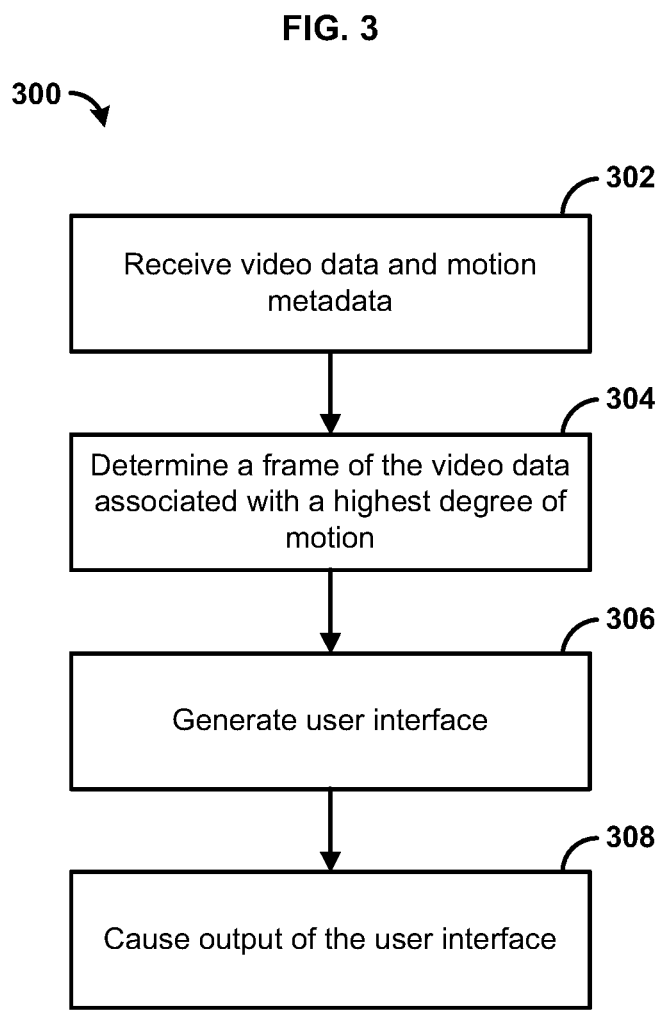

Receive video data and motion metadata

304

Determine a frame of the video data associated with a highest degree of motion

306

Generate user interface

308

Cause output of the user interface

Figure 4:
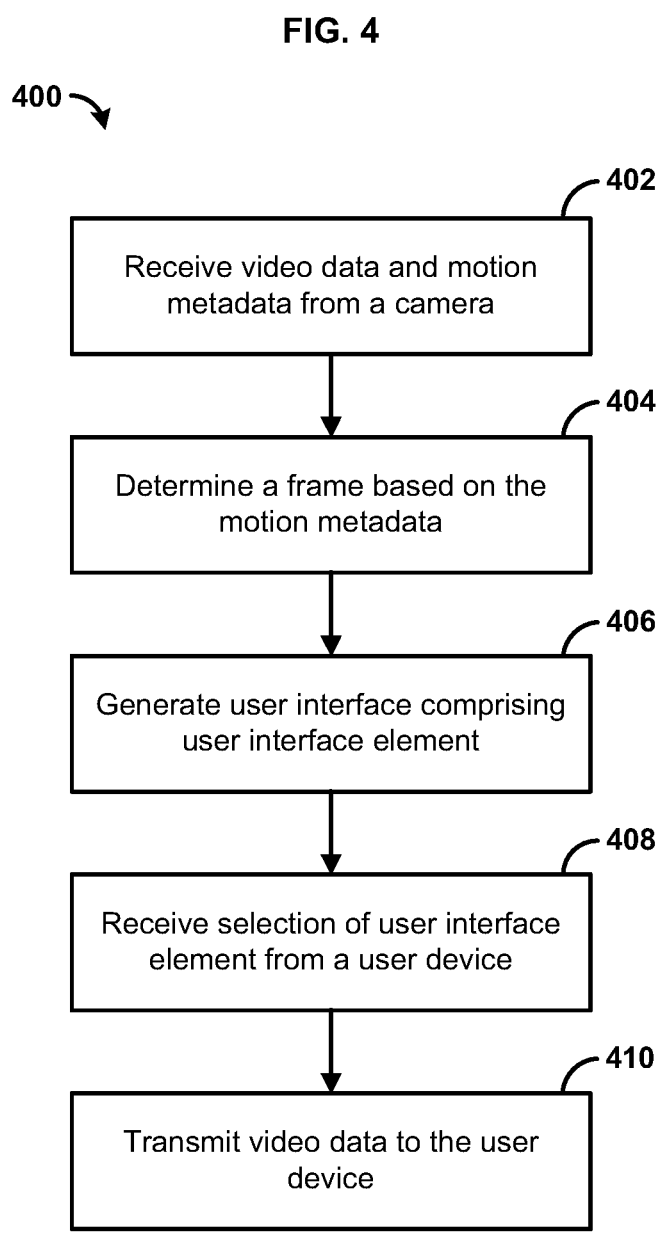

Receive video data and motion
metadata from a camera

404

Determine a frame based on the
motion metadata

406

Generate user interface comprising
user interface element

408

Receive selection of user interface
element from a user device

410

Transmit video data to the user
device

IMAGE SELECTION USING MOTION DATA

CROSS REFERENCE TO RELATED PATENT APPLICATIONS

This application claims priority under 35 U.S.C. § 120 to, and is a continuation of, U.S. patent application Ser. No. 15/887,662, filed on Feb. 2, 2018, the entire contents of which are hereby incorporated herein by reference for all purposes.

BACKGROUND

Video capture systems, including home-security systems, can record video for later viewing by a user. Thus video may be separated into various portions selectable for viewing. These portions are presented to the user with an image representative of the content of the portion. However, the image is selected without regard to the underlying content of the video (e.g., always select the first frame). These and other shortcomings are addressed by the methods and systems described herein.

SUMMARY

It is to be understood that both the following general description and the following detailed description are exemplary and explanatory only and are not restrictive. Provided are methods and systems for detecting motion in video. A camera can be configured to capture video data. For example, the camera can be included in a home security system and can be configured to capture video data in response to a trigger, such as when motion is detected. The captured video data can be transmitted to a server for later access by a user via an interface (e.g., a graphical user interface (GUI)).

The interface can be configured to permit a user to access and/or view portions of the captured video data. The interface can comprise an image, or "thumbnail," representing the content of a given portion of the captured video data. To determine the thumbnail, the camera, or other device in communication with the camera, can determine motion metadata associated with the video data. The motion metadata can be determined by a number of pixels changed for the video data, e.g., for each second of the video data. The motion metadata can also be determined by background subtraction. The motion metadata can express degrees of motion in the video data. For example, the motion metadata can express, for each second of video data, a degree of motion occurring in a given second of the video data. The camera can transmit, or cause transmission of, motion metadata along with the video data to the server. The motion metadata can be included in on a header or a tag attached to the video data.

Using the motion metadata, the server can then select an image corresponding to a highest degree of motion in the captured video data. The selected image can then be used as a thumbnail in the interface, allowing for a selection of the captured video data. In response to a selection of the thumbnail, the captured video data can be transmitted to a user device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 1 is a diagram of an example network;

FIG. 2 is an example header structure for motion metadata;

FIG. 3 is a flowchart of an example method;

FIG. 4 is a flowchart of an example method; and

DETAILED DESCRIPTION

Figure 5:
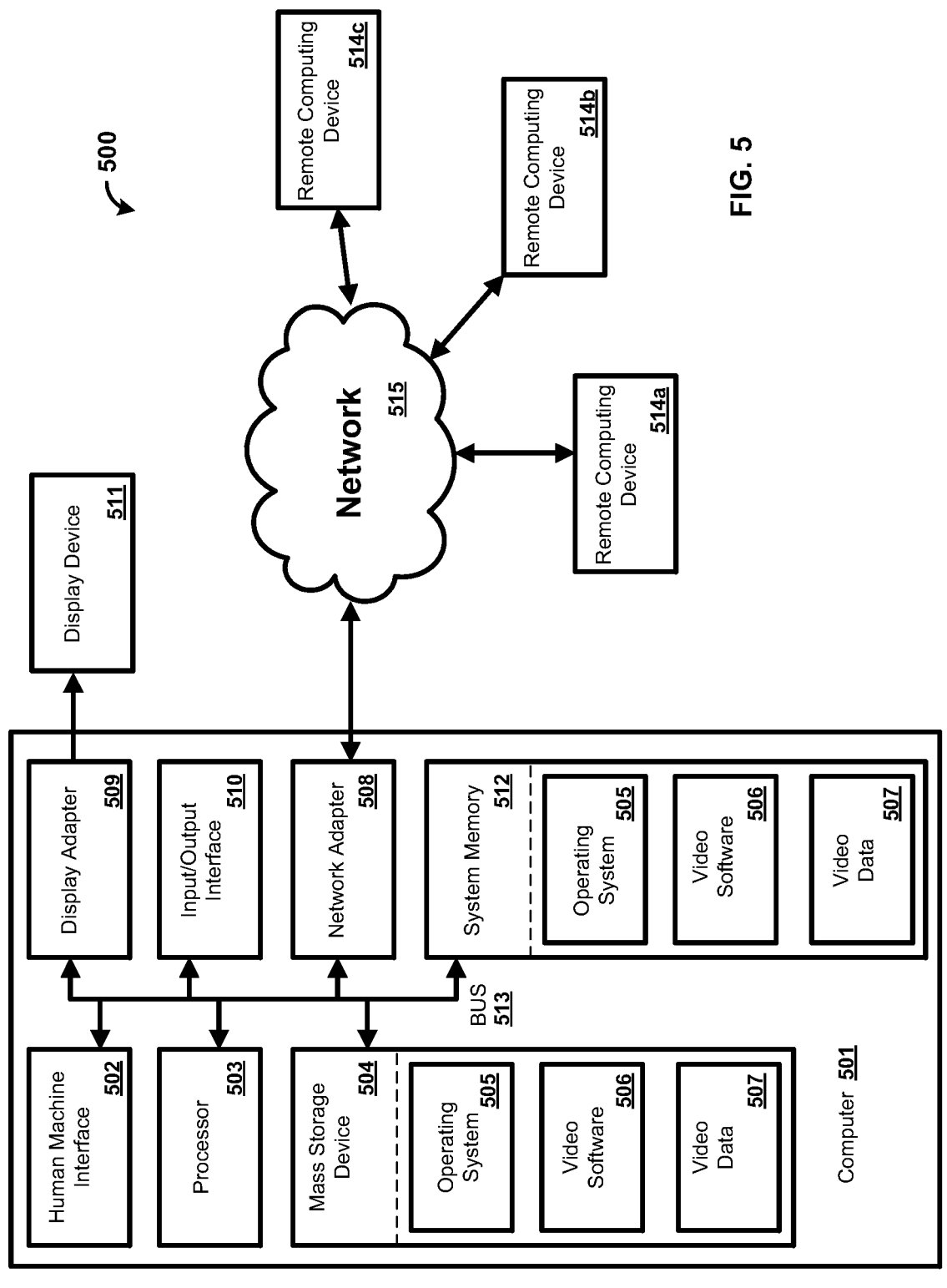
FIG. 5 is a block diagram of an example computing device.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are based on approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes examples where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all examples of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to detecting motion in video data in order to select a representative image for the video data. A camera can be configured to capture video data. For example, the camera can be configured to record, into a buffer, a duration (e.g., quantity) of video data (e.g., ten seconds, fifteen seconds) and then transmit the buffered video data to a server. The camera, or device in communication with the camera, can also generate motion metadata for the video data. The motion metadata can describe an amount of motion in the video data. For example, the motion metadata can describe, for each second of video data, an amount of motion occurring in a respective second of video data. The motion metadata can be encoded as a header or a tag for the video data that is transmitted to the server with the video data. The server can also be configured for determining the motion metadata from the video data, rather than, or in addition to, the camera.

The server can then use the motion metadata to determine an image to use as an element for the video data. The image can be determined as a frame of the video data corresponding to a period of highest motion as indicated by the motion metadata. For example, the server can determine a second in the video data corresponding to a highest degree of motion. The server can then determine, from the determined second in the video data, a frame as the image. The determined image can then be used as the element, or "thumbnail," allowing for a selection of the video data. As the camera, or device in communication with the camera, transmits additional portions of video data and/or motion metadata to the server, additional "thumbnails" can be determined for these additional portions of video data. A user interface can be updated to include the additional thumbnails. A selection of a thumbnail (e.g., a selection received from a user device) can initiate a transmission of the corresponding portion of video data to the user device or other device.

Figure 1:
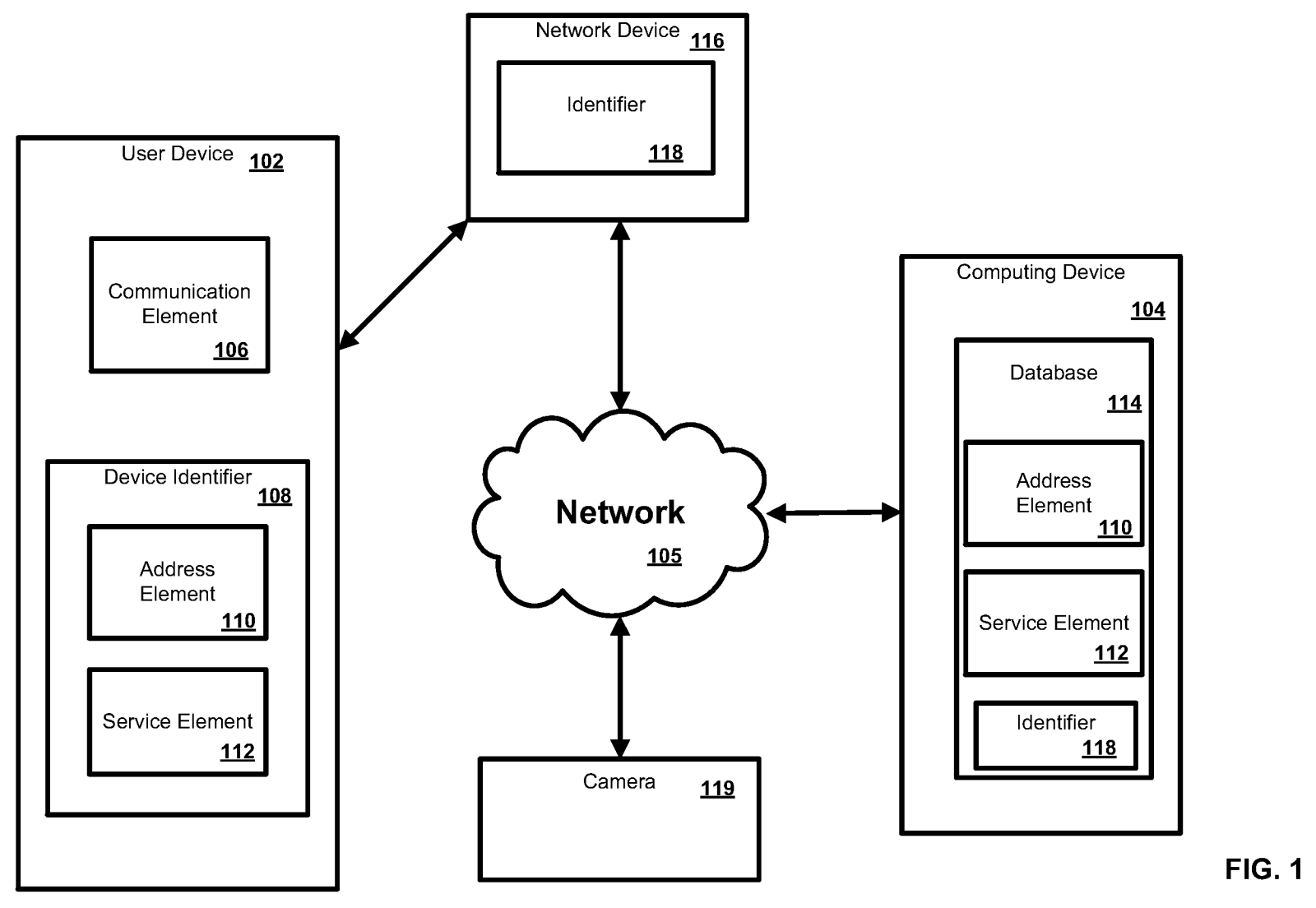

FIG. 1 shows various examples of an exemplary environment. The present disclosure is relevant to systems and methods for providing services to a device, for example, a user device such as a computer, tablet, mobile device, communications terminal, or the like. One or more network devices can be configured to provide various services to one or more devices, such as devices located at or near a premises. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet or a local area network. Other forms of communications can be used such as wired and wireless telecommunication channels, for example.

The user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer®, Mozilla Firefox®, Google Chrome®, Safari®, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

The user device 102 can be associated with a user identifier or device identifier 108. As an example, the device identifier 108 can be any identifier, token, character, string, or the like, for differentiating one user or user device (e.g., user device 102) from another user or user device. The device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

The device identifier 108 can comprise an address element 110 and a service element 112. The address element 110 can comprise or provide an internet protocol address, a network address, a media access control (MAC) address, an Internet address, or the like. As an example, the address element 110 can be relied upon to establish a communication session between the user device 102 and the computing device 104 or other devices and/or networks. As a further example, the address element 110 can be used as an identifier or locator of the user device 102. The address element 110 can be persistent for a particular network.

The service element 112 can comprise an identification of a service provider associated with the user device 102 and/or with the class of user device 102. The class of the user device 102 can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the user device 102. As a further example, the service element 112 can comprise information relating to a preferred service provider for one or more particular services relating to the user device 102. The address element 110 can be used to identify or retrieve data from the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

The computing device 104 can be a server for communicating with the user device 102. As an example, the computing device 104 can communicate with the user device 102 for providing data and/or services. As an example, the computing device 104 can provide services such as network (e.g., Internet) connectivity, network printing, media management (e.g., media server), content services, streaming services, broadband services, or other network-related services. The computing device 104 can allow the user device 102 to interact with remote resources such as data, devices, and files. For example, the computing device 104 can generate and transmit user interfaces to the user device 102. The user interfaces can facilitate the transmission of video data to the user device 102. For example, selection an element can cause transmission of a corresponding portion of video data to the user device 102.

The computing device 104 can manage the communication between the user device 102 and a database 114 for sending and receiving data therebetween. As an example, the database 114 can store a plurality of files (e.g., web pages), user identifiers or records, video data, images (e.g., thumbnail images corresponding to video data), or other information. As a further example, the user device 102 can request and/or retrieve a file from the database 114. The database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. For example, authentication credentials corresponding to a user login from a user device 102 can be retrieved from the database 114. As another example, video data can be retrieved from the database 114 in response to a selection, from the user device 102, of an element (e.g., a thumbnail image). The database 114 can be disposed remotely from the computing device 104 and accessed via direct or indirect connection. The database 114 can be integrated with the computing system 104 or some other device or system.

One or more network devices 116 can be in communication with a network such as network 105. As an example, one or more of the network devices 116 can facilitate the connection of a device, such as user device 102, to the network 105. As a further example, one or more of the network devices 116 can be configured as a wireless access point (WAP). One or more network devices 116 can be configured to allow one or more wireless devices to connect to a wired and/or wireless network using Wi-Fi, Bluetooth or any desired method or standard.

The network devices 116 can be configured as a local area network (LAN). As an example, one or more network devices 116 can comprise a dual band wireless access point. As an example, the network devices 116 can be configured with a first service set identifier (SSID) (e.g., associated with a user network or private network) to function as a local network for a particular user or users. As a further example, the network devices 116 can be configured with a second service set identifier (SSID) (e.g., associated with a public/community network or a hidden network) to function as a secondary network or redundant network for connected communication devices.

One or more network devices 116 can comprise an identifier 118. As an example, one or more identifiers can be or relate to an Internet Protocol (IP) Address IPV4/IPV6 or a media access control address (MAC address) or the like. As a further example, one or more identifiers 118 can be a unique identifier for facilitating communications on the physical network segment. Each of the network devices 116 can comprise a distinct identifier 118. As an example, the identifiers 118 can be associated with a physical location of the network devices 116.

A camera 119 can be configured to capture, record, and/or encode video data. The video data can comprise a plurality of frames. The video data can also comprise audio data. For example, the camera 119 can be configured to store, or cause storage of, e.g., in a buffer, video data in response to detecting a motion event. Detecting a motion event can comprise detecting a color change in a number of pixels satisfying a threshold. In such an example, the number of pixels can correspond to a portion of a viewing area of the camera 119. Detecting a motion event can also comprise receiving a signal from a motion sensor external to (not shown), or a component of, the camera 119.

The camera 119 can be configured to store, e.g., in the buffer, a predefined duration of video data, e.g., five seconds, ten seconds, fifteen seconds. The camera 119 can generate motion metadata for the buffered video data. Generating the motion metadata can occur concurrently to or in parallel with the storage of the video data in the buffer. Generating the motion metadata can also occur after the redefined duration of video data has been stored. The motion metadata can comprise a plurality of entries each corresponding to a time period in the video data. For example, the motion metadata can comprise a plurality of entries each corresponding to a respective second of the video data.

Each entry in the motion metadata can express a degree of motion in the corresponding time period of the video data, e.g., the corresponding second of the video data. Accordingly, generating the motion metadata can comprise determining, for each time period of the video data, a degree of motion. Determining a degree of motion of a time period of the video data can include determining a number or percentage of pixels changed during the time period of the video data. For example, assume a camera 119 capturing video at 720p (720 lines of 1280 pixels each), thereby capturing frames of video data comprising 921600 pixels. The camera 119 can determine that, during a given second of video data, 571392 pixels (62 percent) of pixels change. The degree of motion for that given second of video data can then be determined as the percentage of pixels changed during that second of video, e.g., 62 percent. The degree of motion for that given second of video data can also include a predefined range into which the percentage of pixels changed falls. For example, for a given second of video data during which 62 percent of pixels are changed, it can be determined that the degree of motion corresponds to a range of 61-70 percent of pixels changed.

As another example, the degree of motion can be based on a number of pixels or a percentage of pixels changed from one frame to a subsequent frame. For example, a degree of motion for a given second of video data can be based on a highest number of pixels or a highest percentage of pixels changed between any pair of frames in the second of video data.

Determining a degree of motion of a time period of the video data can include determining a highest difference of a frame in the given time period of the video data relative to a reference frame. A reference frame can be determined as a first frame of the video data. For example, each frame of video data for a given second of video data can be compared to the reference frame using background subtraction. In other words, a background subtraction differential can be calculated for each frame in a given second of video data relative to the reference frame. The background subtraction differential can be expressed as a number of pixels or a percentage of pixels. Thus degree of motion for that given second of video data can then be determined as the greatest background subtraction differential for any frame in the given second of video data relative to the reference frame. For example, for a given second of video data, a frame in the given second of video data is at most 45 percent different relative to the reference frame. Thus, the degree of motion can be based on 45 percent. The degree of motion for that given second of video data can also include a predefined range into which the determined percentage falls, e.g., 41-50 percent.

The motion metadata can comprise an array, with each entry in the array corresponding to a second of video data. As an example, each entry in the array can identify a number of pixels or a percentage of pixels changed in the corresponding second of video data. As another example, each entry in the array can identify a greatest background subtraction differential relative to a reference frame in the corresponding second of video data.

As a further example, each entry in the array can comprise a byte. The first four bits of the byte can be reserved as a bit mask for 0-4 tags. The next four bits of the byte can be used to identify a degree of motion for the corresponding second of video data by identifying a range into which a percentage of pixels changed falls, e.g., within the corresponding second of video data or relative to a reference frame.

For example, four bits of the byte in the motion metadata array can be determined according to the following scheme:

0x0→0%
0x1→1-10%
0x2→11-20%
0x3→21-30%
0x4→31-40%
0x5→41-50%
0x6→51-60%

9

0x7→61-70%
0x8→71-80%
0x9→81-90%
0xA→91-100%
0xB→100%
0xC→100%
0xD→100%
0xE→100%
0xF→100%

Thus, the degree of motion for a given second of video data can be expressed in four bits, allowing for a reduced data size of the motion metadata compared to specifically identifying a number of pixels changed or a specific percentage of pixels changed.

The motion metadata can be generated as a header, e.g., comprising a byte array. The header can then be transmitted with the buffered video data to the computing device 104. For example, the motion metadata can be generated as a Hypertext Transfer Protocol (HTTP) header, and the video data can be transmitted to the computing device 104 by the camera 119 using HTTP. Thus, the computational burden for identifying motion in the video data is placed on the camera 119. This provides greater advantages in systems in which a computing device 104 receives video data from many cameras 119 by distributing the computational burden across many devices.

The operations set forth above are described as being performed by a camera 119. It is understood that these operations can also be performed by one or more devices (e.g., computing devices) in communication with the camera 119. These one or more devices can then be in communication (e.g., wired or wirelessly) with a network device 116. The camera 119 can be configured to communicate with the computing device via a wired or wireless connection. For example, the camera 119 can transmit video data to one or more devices in communication with the camera 119. These one or more devices can then generate the motion metadata and/or transmit the motion metadata and video data to the computing device 104 via the network device 116.

The computing device 104 can determine, based on the motion metadata, an image from to the video data. Determining the image can comprise determining an image associated with a period of highest motion in the video data. For example, as the motion metadata can comprise a plurality of entries, e.g., array entries, each corresponding to a respective second of the video data, the computing device 104 can determine a second in the video data having a highest degree of motion. The image can then be selected from the determined second in the video data. For example, the computing device 104 can determine the image as a first frame of determined second in the video data. As another example, the computing device 104 can determine the image as a random frame in determined second in the video data. As a further example, the computing device 104 can determine the image as a median frame in determined second in the video data.

The computing device 104 can then generate a user interface with an element comprising the image and corresponding to the video data. The user interface can be transmitted to a user device 102. A selection of the element can cause a transmission of the video data to the user device 102.

The camera 119 can transmit additional video data and motion metadata to the computing device 104. For example, the camera 119 can continuously record video data by buffering and transmitting multiple portions of video data and corresponding motion metadata to the computing device

10

104. In such an example, the computing device 104 can determine images for each portion of video data using the corresponding motion metadata. A user interface comprising a plurality of elements each comprising one of the determine images and corresponding to one of the portions of video data. A selection of an element can cause transmission of a portion of video data to the user device. One or more other portions of video data (e.g., portions of video data sequentially subsequent to the selected video data) can be subsequently transmitted. Thus, a user device can receive both the selected video data and can continue to receive video data recorded after the selected video data.

FIG. 2 is a table 200 describing example motion metadata as a byte array. For example, the byte array could be included in a header such as a Hypertext Transfer Protocol (HTTP) header. The HTTP header could be applied to one or more packets of video data being transmitted via HTTP. In this example, the motion metadata corresponds to fifteen seconds of video data. The byte array comprises sixteen bytes. The first byte, index 0, is reserved to describe a version associated with the motion metadata. The index 0 byte can also be used to describe other attributes of the motion metadata. Bytes at indices 1-15 describe an amount of motion, based on a percentage value, at a corresponding second of the video data. The percentage value can correspond to a percentage of pixels in a given second of video data that change during the second of video data. The percentage value can also correspond to, for all frames in the given second of video data, a highest percentage of pixels different relative to a reference frame.

In this example, the first four bits of a byte in the byte are reserved as a bit mask for four tags. Thus, bit 0001 corresponds to "tag 1," bit 0010 corresponds to "tag 2," bit 0100 corresponds to "tag 3," and bit 1000 corresponds to "tag 4." The next four bits of the byte identify a range of percentage values in which the degree of motion falls. These four bits of the byte in the motion metadata array can be determined according to the following scheme:
0x0→0%
0x1→1-10%
0x2→11-20%
0x3→21-30%
0x4→31-40%
0x5→41-50%
0x6→51-60%
0x7→61-70%
0x8→71-80%
0x9→81-90%
0xA→91-100%
0xB→100%
0xC→100%
0xD→100%
0xE→100%
0xF→100%

Thus, as an example, if a given second of video has a degree of motion based on a percentage value between 61 and 70 percent, the corresponding bits of the byte array would be set to "0111," or "0x7."

The example table 200 corresponds to a byte array of [0x00,0x3F,0x1F,0x09,0x08,0x07,0x05,0x05,0x02,0x00, 0x00,0x00,0x00,0x00,0x00,0x00]. Here, byte[0] indicates that the motion metadata corresponds to version "0." Byte [1] has a value of 0x3F, indicating that "tag 1" and "tag 2" are set, and 100 percent of pixels change in the first second of the video data. Byte[2] has a value of 0x1F, indicating that "tag 1" is set, and 100 percent of pixels change in the second second of the video data. Bytes[3-8] each indicate a range of pixels change in their corresponding seconds of video data. Bytes[9-15] each indicate that no pixels change in their corresponding seconds of video data, e.g., a still image is displayed.

FIG. 3 is a flowchart 300 of an example method. At step 302, video data and motion metadata can be received, e.g., from a camera 119 by a computing device 104. The motion metadata can be generated by the camera 119. The motion metadata can comprise a header applied to the video data. For example, the motion metadata can comprise a Hypertext Transfer Protocol (HTTP) header applied to the video data by the camera 119. The motion metadata can comprise a byte array. The motion metadata can comprise a plurality of entries each corresponding to a respective time period of the video data, e.g., a respective second of the video data. The motion metadata can describe, for each respective time period (e.g., each respective second), a degree of motion occurring in the respective time period. The degree of motion indicated in the motion metadata can be based on a number or percentage of pixels changed during the respective time period. The degree of motion indicated in the motion metadata can be based on a number or percentage of pixels changed across consecutive frames in the respective time period. For example, the degree of motion can correspond to, for each frame of video data in the respective time period, a highest number or percentage of pixels changed across consecutive frames. The degree of motion indicated in the motion metadata can be based on, for each frame in the respective period of video data, a background subtraction differential relative to a reference frame. For example, the degree of motion in the motion metadata for a given time period can be based on, for each frame in the respective period of video data, a highest background subtraction differential. The reference frame can comprise a first frame of the video data, or another frame of the video data.

At step 304 it can be determined, e.g., by the computing device 104, a frame in the video data associated with a highest degree of motion. For example, the computing device 104 can determine, based on the motion metadata, a period in the video data associated with a highest degree of motion. As an example, the motion metadata can comprise a plurality of entries each corresponding to a respective second in the video data. A second in the video data can be determined to be associated with a highest degree of motion in response to the corresponding motion metadata entry indicating a highest degree of motion relative to other motion metadata entries. After determining a second in the video data, a frame from that second in the video data can be determined. The frame can be determined as a first frame in the second of the video data. The frame can be determined as a median frame in the second of the video data. The frame can be determined randomly from a plurality of frames in the second of video data.

At step 306 a user interface can be generated, e.g., by the computing device 104. The user interface can comprise an element (e.g., a selectable element) indicating the frame. For example, generating the user interface can comprise generating an image (e.g., a thumbnail image) based on the frame. For example, the frame can be encoded, decoded, transformed, or otherwise modified to generate the image. The frame can be transformed into an image of a greater or lesser resolution than the frame. The frame can also be compressed or otherwise modified to generate the image. The selectable element can then comprise the thumbnail image.

The element can correspond to the received video data. A selection of the element can cause transmission, e.g., to a user device, the received video data. The element can be one of a plurality of elements each corresponding to a respective portion of video data. A selection of an element (e.g., a selectable element) can cause transmission, e.g., to the user device, of the portion of video data corresponding to the selected element. Where one or more portions of video data form a sequence of video data, a selection of a first element corresponding to a first portion of video data in the sequence can cause transmission of the first portion of video data and one or more subsequent second portions of video data. At step 308, output of the user interface can be caused, e.g., by the computing device 104. For example, the user interface can be transmitted to a user device.

FIG. 4 is a flowchart 400 of an example method. Beginning with step 402, video data and motion metadata can be received from a camera 119, e.g., by a computing device 104. The motion metadata can be generated by the camera 119. The motion metadata can comprise a header applied to the video data. For example, the motion metadata can comprise a Hypertext Transfer Protocol (HTTP) header applied to the video data by the camera 119. The motion metadata can comprise a byte array. The motion metadata can comprise a plurality of entries each corresponding to a respective time period of the video data, e.g., a respective second of the video data. The motion metadata can describe, for each respective time period (e.g., each respective second), a degree of motion occurring in the respective time period. The degree of motion indicated in the motion metadata can be based on a number or percentage of pixels changed during the respective time period. The degree of motion indicated in the motion metadata can be based on a number or percentage of pixels changed across consecutive frames in the respective time period. For example, the degree of motion can correspond to, for each frame of video data in the respective time period, a highest number or percentage of pixels changed across consecutive frames. The degree of motion indicated in the motion metadata can be based on, for each frame in the respective period of video data, a background subtraction differential relative to a reference frame. For example, the degree of motion in the motion metadata for a given time period can be based on, for each frame in the respective period of video data, a highest background subtraction differential. The reference frame can comprise a first frame of the video data, or another frame of the video data.

At step 404 it can be determined, e.g., by the computing device 104, a frame in the video data associated with a highest degree of motion. For example, the computing device 104 can determine, based on the motion metadata, a period in the video data associated with a highest degree of motion. As an example, the motion metadata can comprise a plurality of entries each corresponding to a respective second in the video data. A second in the video data can be determined to be associated with a highest degree of motion in response to the corresponding motion metadata entry indicating a highest degree of motion relative to other motion metadata entries. After determining a second in the video data, a frame from that second in the video data can be determined. The frame can be determined as a first frame in the second of the video data. The frame can be determined as a median frame in the second of the video data. The frame can be determined randomly from a plurality of frames in the second of video data.

At step 406 a user interface can be generated, e.g., by the computing device 104. The user interface can comprise an element (e.g., a selectable element) indicating the frame. For example, generating the user interface can comprise generating an image (e.g., a thumbnail image) based on the frame.

The frame can be encoded, decoded, transformed, or otherwise modified to generate the image. The frame can be transformed into an image of a greater or lesser resolution than the frame. The frame can also be compressed or otherwise modified to generate the image. The element can correspond to the received video data. The user interface can comprise, for example, a web page receivable by a user device 102. The user interface can comprise data for rendering by a dedicated application executed on the user device 102. The user interface can be one of a plurality of elements each corresponding to a respective portion of video data.

At step 408 a selection of the element can be received from a user device 102, e.g., by the computing device 104. In response to the selection of the element, at step 410, the video data can be transmitted to the user device 102. The video data can be included as one of a plurality of portions of video data forming a sequence of video data. In response to the selection of the element, after transmission of the video data, subsequent portions of video data in the sequence of video data can be transmitted to the user device 102.

The methods and systems can be implemented on a computer 501 as illustrated in FIG. 5 and described below. By way of example, the computing device 104 of FIG. 1 can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503, a system memory 512, and a system bus 513 that couples various system components including the one or more processors 503 to the system memory 512. The system can utilize parallel computing.

The system bus 513 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 113, and all buses specified in this description can also be implemented over a wired or wireless network connection and each of the subsystems, including the one or more processors 503, a mass storage device 504, an operating system 505, video software 506, video data 507, a network adapter 508, the system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as the video data 507 and/or program modules such as the operating system 505 and the video software 506 that are immediately accessible to and/or are presently operated on by the one or more processors 503.

The computer 501 can also comprise other removable/non-removable, volatile/non-volatile computer storage media. By way of example, FIG. 5 illustrates the mass storage device 504 which can provide non-volatile storage of computer code, computer readable instructions, data structures, program modules, and other data for the computer 501. For example and not meant to be limiting, the mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, the operating system 505 and the video software 506. Each of the operating system 505 and the video software 506 (or some combination thereof) can comprise elements of the programming and the video software 506. The video data 507 can also be stored on the mass storage device 104. The video data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

The user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 503 via the human machine interface 502 that is coupled to the system bus 513, but can be connected by other interface and bus structures, such as a parallel port, game port, an IEEE 1394 Port (also known as a Firewire port), a serial port, or a universal serial bus (USB).

The display device 511 can also be connected to the system bus 513 via an interface, such as the display adapter 509. It is contemplated that the computer 501 can have more than one display adapter 109 and the computer 501 can have more than one display device 511. For example, the display device 511 can be a monitor, an LCD (Liquid Crystal Display), or a projector. In addition to the display device 511, other output peripheral devices can comprise components such as speakers (not shown) and a printer (not shown) which can be connected to the computer 501 via the Input/Output Interface 510. Any step and/or result of the methods can be output in any form to an output device. Such output can be any form of visual representation, including, but not limited to, textual, graphical, animation, audio, tactile, and the like. The display device 511 and computer 501 can be part of one device, or separate devices.

The computer 501 can operate in a networked environment using logical connections to one or more remote computing devices 514a,b,c. By way of example, a remote computing device can be a personal computer, portable computer, smartphone, a server, a router, a network computer, a peer device or other common network node, and so on. Logical connections between the computer 501 and a remote computing device 514a,b,c can be made via a network 515, such as a local area network (LAN) and/or a general wide area network (WAN). Such network connections can be through the network adapter 508. The network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the one or more processors 503 of the computer. An implementation of the video software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving a plurality of portions of a content item, each of the plurality of the portions comprising a plurality of frames comprising metadata;
   determining, based on the metadata, a first portion of the plurality of the portions of the content item comprising a frame associated with a highest quantity of pixel changes, relative to a reference frame, in the content item; and
   causing output of at least one frame of the first portion of the plurality of the portions of the content item.

2. The method of claim 1, wherein the at least one frame of the first portion of the plurality of the portions of the content item comprises the frame associated with the highest quantity of pixel changes relative to the reference frame.

3. The method of claim 1, wherein the at least one frame of the first portion of the plurality of the portions of the content item comprises a frame of the plurality of frames of the first portion other than the frame associated with the highest quantity of pixel degree of difference in the pixels relative to the reference frame.

4. The method of claim 1, further comprising encoding the plurality of frames with the metadata, wherein the metadata indicates a respective quantity of pixel changes associated with each frame of the plurality of frames.

5. The method of claim 1, wherein the at least one frame of the first portion of the content item comprises a selectable element indicating a frame of the first portion of the content item, wherein the method further comprises:

receiving a selection of the selectable element; and sending, to a user device, at least the first portion of the content item.

6. The method of claim 1, wherein the frame associated with the highest quantity of pixel changes is associated with at least one of: a highest number of pixel changes or a highest percentage of pixel changes.

7. The method of claim 1, wherein the reference frame comprises a frame that precedes the frame associated with the highest quantity of pixel changes or a frame that is subsequent to the frame associated with the highest quantity of pixel changes.

8. The method of claim 1, wherein the at least one frame of the first portion of the plurality of the portions of the content comprises at least one of: a first temporally positioned frame of the first portion of the content item, a randomly selected frame of the first portion of the content item, or a median frame of the first portion of the content item.

9. A method comprising:

receiving a plurality of portions of a content item;

determining, based on metadata, a portion of the plurality of the portions of the content item comprising a frame having a highest quantity of pixel changes, in the content item, relative to a reference frame; and causing output of an output frame of the portion of the content item.

10. The method of claim 9, wherein the output frame comprises at least one of: the frame having the highest quantity of pixel changes relative to the reference frame, a first temporally positioned frame of the portion of the content item, a randomly selected frame of the portion of the content item, or a median frame of the portion of the content item.

11. The method of claim 9, further comprising encoding a plurality of frames of the plurality of the portions of the content item with the metadata.

12. The method of claim 9, wherein the metadata indicates a respective quantity of pixel changes associated with each frame of a plurality of frames for the plurality of the portions of the content item.

13. The method of claim 9, wherein the output frame comprises a selectable element indicating a frame of a plurality of frames in the portion of the content item, wherein the method further comprises:

receiving a selection of the selectable element; and sending, to a user device, at least the portion of the content item.

14. The method of claim 9, wherein receiving the plurality of the portions of the content item comprises receiving the plurality of the portions of the content item from a video capture device.

15. The method of claim 9, wherein the frame with the highest quantity of pixel changes relative to the reference frame is associated with at least one of: a highest number of pixel changes or a highest percentage of pixel changes.

16. The method of claim 9, wherein the reference frame comprises a frame that precedes the frame having the highest quantity of pixel changes or a frame that is subsequent to the frame having the highest quantity of pixel changes.

17. A method comprising:

receiving a plurality of portions of a content item, each of the plurality of the portions comprising a plurality of frames comprising metadata;

determining, based on the metadata, a first portion of the plurality of the portions of the content item comprising a frame associated with a highest quantity of pixel changes, relative to a reference frame, in the content item;

causing output of an element that indicates a frame of the first portion of the content;

receiving, from a user device, a selection of the element; and sending, to the user device, at least a portion of the first portion of the content item.

18. The method of claim 17, wherein the element comprises at least one of: the frame associated with the highest quantity of pixel changes relative to the reference frame, a first temporally positioned frame of the first portion of the content item, a randomly selected frame of the first portion of the content item, or a median frame of the first portion of the content item.

19. The method of claim 17, wherein sending the at least the portion of the first portion of the content item comprises sending at least the first portion of the content item.

20. The method of claim 17, wherein the element comprises a thumbnail of the frame of the first portion of the content.

* * * * *